(12) United States Patent
Dougherty et al.

(10) Patent No.: US 8,461,277 B2
(45) Date of Patent: Jun. 11, 2013

(54) CAUSTIC REMOVABLE HOT MELT ADHESIVE FORMULATIONS

(75) Inventors: William R. Dougherty, Lancaster, PA (US); Alan J. Pape, Honey Brook, PA (US); Nestor P. Hansen, Coatesville, PA (US); W. Paul Boggs, Coatesville, PA (US); Charles C. Mateer, Richboro, PA (US)

(73) Assignee: Cray Valley USA, LLC, Exton, PA (US)

( * ) Notice: Subject to any disclaimer, the term of this patent is extended or adjusted under 35 U.S.C. 154(b) by 270 days.

(21) Appl. No.: 12/754,071

(22) Filed: Apr. 5, 2010

(65) Prior Publication Data

US 2010/0255228 A1    Oct. 7, 2010

Related U.S. Application Data

(60) Provisional application No. 61/166,973, filed on Apr. 6, 2009.

(51) Int. Cl.
| | |
|---|---|
| *C08F 20/06* | (2006.01) |
| *C08F 20/10* | (2006.01) |
| *C08F 20/44* | (2006.01) |
| *C08F 20/68* | (2006.01) |
| *C08F 22/10* | (2006.01) |

(52) U.S. Cl.
USPC ............... 526/317.1; 526/318; 526/318.1; 526/318.2; 526/318.4; 526/319; 526/326; 525/207; 525/221

(58) Field of Classification Search
USPC ............ 526/317.1, 318, 318.1, 318.2, 318.3, 526/318.4, 319, 326; 525/207, 221
See application file for complete search history.

(56) References Cited

U.S. PATENT DOCUMENTS

| | | | |
|---|---|---|---|
| 3,365,411 A | 1/1968 | Mertzweiller et al. | |
| 4,086,198 A | 4/1978 | Mizuni et al. | |
| 4,215,202 A * | 7/1980 | Park | 521/81 |
| 5,225,451 A * | 7/1993 | Rogers et al. | 521/94 |
| 5,300,569 A * | 4/1994 | Drake et al. | 525/78 |
| 5,414,039 A | 5/1995 | Watson et al. | |
| 5,936,005 A * | 8/1999 | Askienazy et al. | 522/120 |
| 6,034,168 A | 3/2000 | Wang | |
| 7,166,341 B2 | 1/2007 | Heemann et al. | |
| 2004/0159394 A1 | 8/2004 | Heemann et al. | |
| 2005/0154074 A1 | 7/2005 | Husemann et al. | |
| 2008/0108739 A1 | 5/2008 | Valette | |

FOREIGN PATENT DOCUMENTS

EP    2 172 529 A1    4/2010

OTHER PUBLICATIONS

International Search Report mailed Jul. 27, 2010, International Application No. PCT/EP2010/002043.

* cited by examiner

*Primary Examiner* — Nathan M Nutter
(74) *Attorney, Agent, or Firm* — RatnerPrestia

(57) ABSTRACT

An additive composition for imparting caustic removability to a hot melt adhesive comprises a low molecular weight $\alpha,\beta$ ethylenically unsaturated anhydride-containing or acid-containing polymer. The polymer is selected from the group consisting of a low molecular weight carboxylic anhydride homo-polymer or the at least partial ester thereof, a low molecular weight carboxylic anhydride copolymer or the at least partial ester thereof, a low molecular weight carboxylic anhydride polyolefin, a low molecular weight carboxylic anhydride vinyl aromatic copolymer, and a low molecular weight carboxylic anhydride grafted copolymer, or the combination or mixtures thereof. A caustic removable hot melt adhesive composition comprises a hot melt adhesive additive and a conventional hot melt adhesive resin. A caustic removable adhesive label comprises a substrate and a caustic removable hot melt adhesive composition which includes an additive composition. The caustic removable hot melt adhesives can be used on labels for articles, such as glass bottles.

14 Claims, No Drawings

CAUSTIC REMOVABLE HOT MELT ADHESIVE FORMULATIONS

CROSS REFERENCE TO RELATED APPLICATIONS

This application claims priority to U.S. Provisional Patent Application Ser. No. 61/166,973, filed Apr. 6, 2009, which is incorporated fully herein by reference.

FIELD OF THE INVENTION

This invention relates to hot melt adhesive formulations which have properties enabling caustic removability. More particularly, the invention relates to an adhesive additive composition for imparting caustic removability to a hot melt adhesive. Additionally, this invention relates to the hot melt adhesive composition including the additive composition, to the adhesive labels which employ the hot melt adhesive composition, and to the articles upon which the adhesive label is adhered with the adhesive composition of the invention.

BACKGROUND OF THE INVENTION

Hot melt adhesives typically exist as entirely solid materials which do not contain or require any solvents. They are solid materials at ambient room temperature but can be converted to a flowable liquid or fluid state by the application of heat, in which state they may be applied to a substrate. On cooling, the adhesive regains its solid form and gains its cohesive strength. In this regard, hot melt adhesives differ from other types of adhesives, such as water-based adhesives, which achieve the solid state by evaporation, removal of solvents, polymerization, or other means.

These adhesives are particularly useful in the manufacture of a variety of industrial or consumer goods where bonding of various substrates is necessary. An advantage of hot melt adhesives is the absence of a liquid carrier, as would be the case for water-based or solvent-based adhesives, which requires a drying step during application of the adhesive. Suitable hot melt adhesives possess the appropriate bond strength to adhere the substrates involved, and also demonstrate adequate flexibility, no staining or bleedthrough of the substrate, suitable viscosity and open time to function on a variety of substrates, acceptable stability under storage conditions, and acceptable thermal stability under normal application temperature.

Hot melt adhesives may be formulated to be relatively hard and free of tack or, in contrast, to be pressure sensitive, i.e., relatively soft and tacky at room temperature. Hot melt adhesives are increasingly utilized for affixing labels to various substrates, such as to glass or plastic bottles. Pressure sensitive hot melt adhesives for labeling are usually categorized as either removable or permanent. Permanent adhesives are formulated to cause the label to tear upon removal from the substrate. On the contrary, removable adhesives must allow the label to be removed from the substrate with a clean release, i.e., leaving no residue and without the tear of the label stock which occurs in a permanent adhesive application.

Solid hot melt adhesives for permanent adhesives have been widely used for many years. However, a hot melt adhesive, and more particularly a hot melt pressure sensitive adhesive, that gives good removability has not been available. Current removal adhesives are supplied for label stock from acrylic latices and solvented solution adhesives. Both of these materials have high molecular weight polymers that reduce flow on a surface to prevent build up of adhesion. In contrast, hot melt adhesives, in particular hot melt pressure sensitive adhesives, are based on materials having lower molecular weight polymers and high amounts of very low molecular weight components that make reduced flow or wetting on a surface very difficult.

Many different polymers have been used in hot melt adhesives employed in the construction of industrial or consumer goods. Typical hot melt adhesives have employed polymers which have included tri-block copolymers such as styrene-isoprene-styrene (SIS), styrene-butadiene-styrene (SBS), styrene-ethylene-butylene-styrene (SEBS); ethylene-vinyl acetate (EVA) copolymers; and/or amorphous poly-alpha-olefin (APAO). Although these polymers, when properly blended, provide adhesion to most substrates, they are not suitable for certain particular uses. One shortcoming of the prior hot melt adhesives concerns their removability, which is an important feature for purposes of recycling the substrate.

To improve removability of the hot melt adhesive, the prior art has aimed to increase the water-solubility or water-dispersibility characteristics of the adhesive. For example, one known water sensitive hot melt adhesive composition which may be utilized in the manufacturing of disposable goods, especially disposable nonwoven articles, combines high dry bond strength with increased water solubility, thereby permitting the component elements of the disposable article to be recycled or otherwise disposed of in an environmentally friendly manner (i.e., degraded). Other known adhesives relate to a water-soluble or water-dispersible hot melt composition based on graft copolymers. These water-removable hot melt adhesives are used for labelling returnable bottles at high speeds, wherein the labels can be removed by brief soaking in hot water. However, these water-soluble compositions are not favorably employed to adhere labels to glass bottles, where water-resistant characteristics are desired as much as the clean removability of pressure sensitive labels.

Conventional styrene-isoprene-styrene (SIS) block copolymer/hydrocarbon (HC) tackifier-based hot melt adhesives have been used to adhere labels to glass bottles for decades. One of the beneficial properties of these types of adhesives for this application is that they can withstand a 7-day water immersion test. Accordingly, these types of adhesives are known for their favorable water-resistant characteristics. However, this presents a difficult challenge when the labels and adhesives need to be removed in a glass bottle recycling process. Hot caustic baths are successfully used to remove many water-based label adhesives. However, the hot melt adhesives are very resistant to caustic.

SUMMARY OF THE INVENTION

A new additive has now been discovered which imparts caustic removability to conventional hot melt adhesives. For example, particular additives of the present invention impart caustic removability to styrene-isoprene-styrene (SIS) block copolymer/hydrocarbon (HC) tackifier-based hot melt adhesives. An adhesive containing the additive may be formulated to achieve similar water resistance and adhesive strength properties as when the additive is not present, while enabling the clean removability of the labels in caustic baths for recycling purposes. The adhesive containing the additive may be applied to a substrate, such as paper for an adhesive label, for adhesion to an article such as a glass bottle or container. The presence of such an additive in a hot melt adhesive composition improves the caustic removability of the adhesive while maintaining the viscoelastic performance characteristics and adhesive properties of the hot melt adhesive composition.

The present invention relates to an adhesive additive composition for imparting caustic removability to a hot melt adhesive. Additionally, this invention relates to a hot melt adhesive composition, particularly a hot melt pressure sensitive adhesive composition, which includes the adhesive additive composition. The present invention also relates to a hot melt adhesive label, which includes the hot melt adhesive composition and the adhesive additive composition, that is removable by a caustic solution. Furthermore, the invention relates to an article upon which the adhesive label is adhered with use of the adhesive composition of the invention.

According to a first embodiment, the present invention relates to an additive composition for imparting caustic removability to a hot melt adhesive. The additive composition comprises at least one low molecular weight polymer or resin. The terms "polymer" and "resin" are to be interpreted in the present invention as having the same meaning, namely a naturally occurring or synthetic compound consisting of large molecules made up of a linked series of repeated simple molecules by, for example, a polymerization process. The low molecular weight polymer contains at least one α,β ethylenically unsaturated carboxylic anhydride or acid. More particularly, the low molecular weight α,β ethylenically unsaturated anhydride-containing or acid-containing polymer is selected from the group consisting of a low molecular weight carboxylic anhydride homo-polymer or the at least partial ester thereof, a low molecular weight carboxylic anhydride copolymer or the at least partial ester thereof, a low molecular weight carboxylic anhydride polyolefin, a low molecular weight carboxylic anhydride vinyl aromatic copolymer, and a low molecular weight carboxylic anhydride grafted copolymer, or the combination or mixtures thereof. In a further embodiment, combination of at least two of these polymers is possible and is even preferred. The term "low molecular weight" means a weight average molecular weight less than about 50,000. The carboxylic anhydride or acid is selected from the group consisting of maleic anhydride, fumaric acid, itaconic anhydride or acid, and tetrahydrophthalic anhydride or acid.

In at least one particular embodiment, the additive composition comprises a combination or mixture of at least two low molecular weight α,β ethylenically unsaturated carboxylic anhydride-containing polymers or acid-containing polymers selected from the group consisting of a low molecular weight carboxylic anhydride homo-polymer or the at least partial ester thereof, a low molecular weight carboxylic anhydride copolymer or the at least partial ester thereof, a low molecular weight carboxylic anhydride polyolefin, a low molecular weight carboxylic anhydride vinyl aromatic copolymer, and a low molecular weight carboxylic anhydride grafted copolymer, or the combination or mixtures thereof.

In a preferred example of this embodiment, the additive composition comprises a combination of polymers (a) and (b), in which: (a) is at least one low molecular weight partial ester of a copolymer of the carboxylic anhydride or acid; and (b) is at least one low molecular weight polymer grafted by the carboxylic anhydride or acid. In a further embodiment, polymer (a) is preferably a maleic anhydride-vinyl aromatic monomer copolymer, or more preferably a styrene-maleic anhydride copolymer (SMA); and polymer (b) is preferably is a maleated diene homopolymer or copolymer, more preferably a maleated polybutadiene. The additive combination of a low molecular weight styrene-maleic anhydride ester and a maleated polybutadiene resin imparts caustic removal properties to a conventional hot melt adhesive formulation. Adhesives formulated with this combination additive can be used in hot melt adhesive labels, particularly in hot melt pressure sensitive labels for recyclable glass articles, such as bottles. The labels can be removed with caustic, such as in a hot caustic bath, when the objects are recycled. Without being held to the theory, it is believed that the acid and/or anhydride groups of the additive components impart caustic solubility to the otherwise insoluble hot melt adhesive components. For example, the additive imparts caustic solubility to the hot melt adhesive composition comprising of a block copolymer, such as a styrene-isoprene-styrene block copolymer; a tackifying resin, such as a hydrocarbon resin; and a process oil, such as mineral oil. The desired adhesive properties of the hot melt adhesive are retained even though the caustic removability property has been imparted by the addition of the additive.

In another embodiment, the present invention is a caustic removable hot melt adhesive composition, more particularly a hot melt pressure sensitive adhesive composition, which includes a hot melt adhesive additive. The hot melt adhesive composition is caustic removable and includes a hot melt adhesive additive which comprises at least one α,β ethylenically unsaturated carboxylic anhydride-containing polymer or acid-containing polymer. In a further embodiment, the hot melt adhesive composition includes an additive composition which comprises a combination or mixture of at least two low molecular weight α,β ethylenically unsaturated carboxylic anhydride-containing polymers or acid-containing polymers selected from the group consisting of a low molecular weight carboxylic anhydride homo-polymer or the at least partial ester thereof, a low molecular weight carboxylic anhydride copolymer or the at least partial ester thereof, a low molecular weight carboxylic anhydride polyolefin, a low molecular weight carboxylic anhydride vinyl aromatic copolymer, and a low molecular weight carboxylic anhydride grafted copolymer, or the combination or mixtures thereof. As an example of a further embodiment, the hot melt adhesive composition includes an additive composition which comprises a combination of at least one low molecular weight partial ester of a copolymer of the carboxylic anhydride or acid; and (b) is at least one low molecular weight polymer grafted by the carboxylic anhydride or acid. In a further embodiment, polymer (a) is preferably a maleic anhydride-vinyl aromatic monomer copolymer, or more preferably a styrene-maleic anhydride copolymer (SMA); and polymer (b) is preferably is a maleated diene homopolymer or copolymer, more preferably a maleated polybutadiene.

More particularly, the hot melt adhesive composition comprises a hot melt adhesive additive and an adhesive resin of the group consisting of styrene-isoprene-styrene (SIS) block copolymers, hydrocarbon or rosin ester tackifying resins, polyacrylate resins, poly ethylene vinyl acetate (EVA) resins, polystyrene butadiene resins, random styrenebutadiene (SBR) copolymers, styrene-butadiene-styrene (SBS) block copolymers, styrene-ethylene-butylene-styrene (SEBS) block copolymers, amorphous poly-α olefin (APAO) resins, and optionally a process oil, or mixtures thereof. The additive of the hot melt adhesive composition is a low molecular weight α,α ethylenically unsaturated carboxylic anhydride-containing polymer or acid-containing polymer, which may be selected from the group consisting of a low molecular weight carboxylic anhydride homo-polymer or the at least partial ester thereof, a low molecular weight carboxylic anhydride copolymer or the at least partial ester thereof, a low molecular weight carboxylic anhydride polyolefin, a low molecular weight carboxylic anhydride vinyl aromatic copolymer, and a low molecular weight carboxylic anhydride grafted copolymer, or the combination or mixtures thereof. The unsaturated carboxylic anhydride or acid may be selected from the group consisting of maleic anhydride, fumaric acid, itaconic anhydride or acid, and tetrahydrophthalic anhydride or acid. Preferably, maleic anhydride or fumaric acid, and more preferably maleic anhydride is selected. In at least one embodiment, the caustic removable hot melt adhesive composition comprises a low molecular weight styrene-maleic anhydride (SMA) and a low molecular weight maleated polybutadiene, at a ratio of between 60:40 and 40:60. The present invention has a particular usefulness for labels on products which are to be recycled.

In yet another embodiment, the present invention is a caustic removable adhesive label comprising a substrate and a caustic removable hot melt adhesive composition as defined above according to the present invention, wherein the adhesive composition is applied to the substrate for adhesion to an article. The label of the present invention may be a label which, after application of the caustic removable hot melt adhesive composition, may be adhered to an article such as a glass bottle. In at least one embodiment, the caustic removable adhesive label contains a hot melt adhesive composition including an additive composition, in which the additive composition comprises a combination or mixture of a low molecular weight partial ester of a styrene-maleic anhydride (SMA) copolymer or resin and a low molecular weight maleated polybutadiene, in which the low molecular weight SMA ester resin has a ratio of styrene(S):maleic anhydride (MA) of about 1:1 to about 2:1. The adhesive additive is soluble in a caustic (basic) solution having a pH greater than 8.

In another embodiment, the present invention is an article having a caustic removable adhesive label. Particularly, the article is a container and a caustic removable adhesive label is adhered thereto. The label comprises a substrate, such as paper, and a caustic removable hot melt adhesive composition having an additive which comprises a low molecular weight $\alpha,\beta$ ethylenically unsaturated anhydride polymer or acid thereof. The additive is soluble in a caustic solution having a pH greater than 8. The container is made from a material from the group consisting of glass, stainless steel, and high density polyethylene. The label adheres to the article with good adhesion properties, and the article and label are water resistant. The label becomes removable from the article upon being submerged in, or otherwise treated with, a caustic bath having a pH greater than 8.

DETAILED DESCRIPTION OF THE INVENTION

The additive composition of the present invention, which imparts the caustic removability property to a conventional hot melt adhesive formulation, comprises at least one low molecular weight polymer or resin. The low molecular weight polymer contains at least one $\alpha,\beta$ ethylenically unsaturated carboxylic anhydride or acid. More particularly, the low molecular weight $\alpha,\beta$ ethylenically unsaturated anhydride-containing or acid-containing polymer is selected from the group consisting of a low molecular weight carboxylic anhydride homo-polymer or the at least partial ester thereof, a low molecular weight carboxylic anhydride copolymer or the at least partial ester thereof, a low molecular weight carboxylic anhydride polyolefin, a low molecular weight carboxylic anhydride vinyl aromatic copolymer, and a low molecular weight carboxylic anhydride grafted copolymer, or the combination or mixtures thereof; wherein the carboxylic anhydride or acid is selected from the group consisting of maleic anhydride, fumaric acid, itaconic anhydride or acid, and tetrahydrophthalic anhydride or acid. In a further embodiment, combination of at least two of these polymers is possible and is even preferred. The low molecular weight $\alpha,\beta$ ethylenically unsaturated carboxylic anhydride-containing or acid-containing polymer can be added to any conventional hot melt adhesive formulation, such as an adhesive resin of the group consisting of styrene-isoprene-styrene block copolymers, hydrocarbon tackifying resins, polyacrylate resins, poly ethylene vinyl acetate resins, polystyrene butadiene resins, styrene-butadiene-styrene block copolymers, and a process oil, or mixtures thereof. The $\alpha,\beta$ ethylenically unsaturated carboxylic anhydride polymer or acid thereof has a weight average molecular weight less than about 50,000.

In yet a further embodiment, the low molecular weight $\alpha,\beta$ ethylenically unsaturated carboxylic anhydride polymer or acid thereof is selected from the group consisting of a low molecular weight maleic anhydride homo-polymer or the at least partial ester thereof, a low molecular weight maleic anhydride copolymer or the at least partial ester thereof, a low molecular weight maleic anhydride polyolefin, a low molecular weight maleic anhydride vinyl aromatic copolymer, and a low molecular weight maleic anhydride grafted copolymer, or the combination or mixtures thereof.

In a particular embodiment of the present invention, the adhesive additive is a combination of at least one low molecular weight $\alpha,\beta$ ethylenically unsaturated carboxylic anhydride vinyl aromatic monomer copolymer and at least one low molecular weight $\alpha,\beta$ ethylenically unsaturated carboxylic anhydride grafted copolymer. The copolymers of the unsaturated anhydride or acid may be copolymers of the anhydride or acid with a co-monomer selected from vinyl aromatic monomers such as, for example, vinyl toluenes and styrene, or from ethylene and/or propylene. Preferable molar ratio of the co-monomer to the anhydride or acid ranges from about 1:1 to 2:1. The carboxylic anhydride vinyl aromatic copolymer is partially esterified by an alcohol, more particularly by a monoalcohol. For example, the carboxylic anhydride vinyl aromatic monomer copolymer may be at least partially esterified by an aliphatic, linear, or branched C1-C12 monoalcohol, preferably a C2-C8 monoalcohol. The degree of monoesterification of the carboxylic anhydride copolymer may range from 50-100% of the initial anhydrides. Additionally, the carboxylic anhydride vinyl aromatic copolymer can be any partial monoester of the copolymer which is soluble to any degree in basic pH solutions having a pH greater than 8. Both anhydride and ester groups may be present in the carboxylic anhydride vinyl aromatic copolymer. As a particular example, the anhydride-containing or acid-containing copolymer is a styrene-maleic anhydride copolymer, particularly with a molar ratio S:MA of styrene (S) to maleic anhydride (MA) ranging from about 1:1 to 2:1. In at least one embodiment, the carboxylic anhydride vinyl aromatic copolymer is a styrene-maleic anhydride ester ("SMA") copolymer or resin. In this embodiment of the present invention, the low molecular weight carboxylic anhydride grafted polymer of the combination additive is a partially maleated polydiene polymer, such as a polybutadiene copolymer. The maleated polybutadiene copolymer has maleic anhydride content from 10% to 50% w/w, more preferably 10% to 30% w/w, and is soluble to any degree in basic pH solutions having a pH greater than 8. In at least one embodiment, the carboxylic anhydride grafted polymer is a diene homopolymer or copolymer grafted with maleic anhydride, such as maleated polybutadiene ("PBD").

In an embodiment of the present invention, the additive comprises a combination of: (a) a low molecular weight styrene-maleic anhydride ester resin, and (b) a low molecular weight maleated polybutadiene resin. When added to a conventional hot melt adhesive, the combination additive imparts caustic removable properties to the conventional hot melt adhesive formulation. The low molecular weight styrene-maleic anhydride ("SMA") ester resin can have the structure of Formula I:

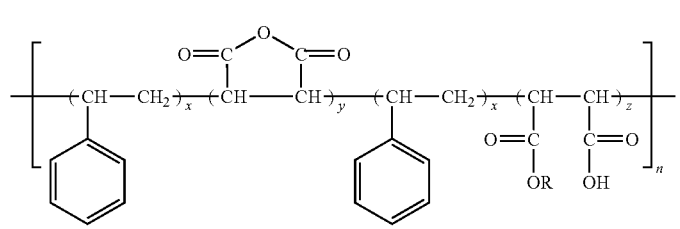

wherein n, R, x, y, and z are as described below.

The number of repeat units n may be from 7 to 72 and relates to the molecular weight of this additive component. R can be any residue of an aliphatic, linear, or branched C1-C12 monoalcohol, preferably a C2-C8 monoalcohol. The monoalcohol may be alkoxylated, such as with up to 8 alkoxy units from an ethoxy group and/or a propoxy group. The SMA ester resin may have different molar ratios of styrene (S)/maleic anhydride (MA) co-monomer compositions, such as a molar ratio (x:(y+z)) in the range from about 1:1 to 2:1 and more preferably from about 1.4:1 to 1.6:1. The molecular variables x, y, and z, relate to the molar ratios of S:MA such that x is from 1 to 4, a molar ratio of (x:(y+z)) is in the range from about 1:1 to 2:1, and the monoesterification molar ratio of (z/(y+z)) ranges from about 50 to 100%. The SMA ester resin can be any partial monoester of a styrene-maleic anhydride resin that is soluble to any degree in basic pH solutions having a pH greater than 8. These monoesters have both acid and anhydride functionality. Particular examples of monoalcohols which may comprise R of Formula I include, but are not limited to, isopropyl and cyclohexyl alcohols. For example, the additive composition may be a (45%/30%) cyclohexyl/isopropyl ester of a styrene-maleic anhydride (SMA) copolymer, which defines a 75% total monoester, and an S:MA ratio of between about 1.4:1 to about 1.6:1.

The low molecular weight maleated polybutadiene ("PBD") can have the structure of Formula II:

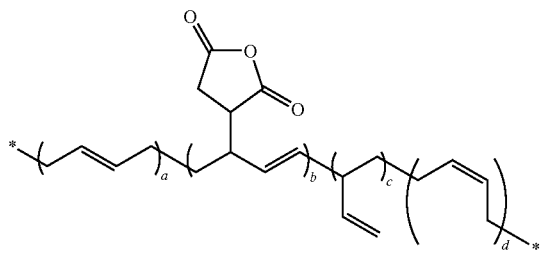

The resin of Formula II can be any partially maleated polybutadiene resin that is soluble to any degree in basic pH solutions. These maleated polybutadiene resins have anhydride functionality. The degree of maleinization (or maleation) of the polybutadiene can range from the least amount needed to render a given polybutadiene partially soluble in a basic pH solution having a pH greater than 8, to as high a level of maleinization as is achievable, while retaining compatibility with the hot melt adhesive formulation components. The maleated polybutadiene copolymer has a maleic anhydride content (i.e., is maleated or maleinized) from 10% to 50% w/w, more preferably 10% to 30% w/w. In a preferred embodiment of the present invention, the additive composition includes a 20% maleated derivative of a polybutadiene.

The term "low molecular weight" according to the invention generally means a weight average molecular weight less than 50,000. When a low molecular weight carboxylic anhydride vinyl aromatic copolymer, such as a styrene-maleic anhydride, is used as the additive or as part of a combination additive, the molecular weight may be effected by the degree of monoesterification, among other factors. The molecular weight of the styrene-maleic anhydride copolymer or resin may thus range from 1,000 to 50,000, or more preferably from 2,000 to 15,000. When a low molecular weight carboxylic anhydride grafted copolymer is employed as the additive or as part of a combination additive, such as maleated polybutadiene, the molecular weight may vary depending on the maleic anhydride content (e.g, the degree of maleinization), among other factors. The molecular weight of the maleated polybutadiene may thus be in the range from 1,000 to 25,000, or more preferably from 2,000 to 10,000. The weight average molecular weight ranges are as measured by gel permeation chromatography (GPC) with polystyrene standards in tetrahydrofuran (THF). When the additive comprises a combination of a low molecular weight styrene-maleic anhydride (SMA) ester resin and a low molecular weight maleated polybutadiene (PBD) resin, the weight ratio of SMA:PBD resins may vary but is preferably from 40:60 to 60:40.

In another embodiment, the present invention is a hot melt adhesive composition which comprises an additive as defined above that imparts caustic removable properties to a conventional hot melt adhesive composition. The additive comprises at least one low molecular weight $\alpha,\beta$ ethylenically unsaturated carboxylic anhydride-containing or acid-containing polymer as defined above. The low molecular weight $\alpha,\beta$ ethylenically unsaturated carboxylic anhydride- or acid-containing polymer can be added to any conventional hot melt adhesive formulation, such as a formulation which comprises an adhesive resin of the group consisting of styrene-isoprene-styrene (SIS) block copolymers, hydrocarbon tackifying resins, polyacrylate resins, poly ethylene vinyl acetate (EVA) resins, polystyrene butadiene resins, random styrenebutadiene (SBR) copolymers, styrene—butadiene-styrene (SBS) block copolymers, styrene-ethylene-butylene-styrene (SEBS) block copolymers, amorphous poly-$\alpha$ olefin (APAO) resins, and a process oil, or mixtures thereof. The $\alpha,\beta$ ethylenically unsaturated carboxylic anhydride polymer or acid thereof has a weight average molecular weight less than 50,000.

In a further embodiment, the hot melt adhesive composition is formulated with the additive combination of a low molecular weight carboxylic anhydride vinyl aromatic monomer copolymer and a low molecular weight carboxylic anhydride grafted copolymer. In a particular embodiment of the present invention, the hot melt adhesive composition includes an additive which comprises a combination of: (a) a low molecular weight styrene-maleic anhydride ester resin, and (b) a low molecular weight maleated polybutadiene resin. The combination additive comprising a low molecular weight styrene-maleic anhydride ester resin and a low molecular weight maleated polybutadiene resin can be added to any conventional hot melt adhesive formulation, such as an adhesive resin of the group consisting of styrene-isoprene-styrene (SIS) block copolymers, hydrocarbon tackifying resins, polyacrylate resins, poly ethylene vinyl acetate (EVA) resins, polystyrene butadiene resins, random styrenebutadiene (SBR) copolymers, styrene-butadiene-styrene (SBS) block copolymers, styrene-ethylene-butylene-styrene (SEBS) block copolymers, amorphous poly-α olefin (APAO) resins, and a process oil, or mixtures thereof.

The additive or additive combination, as defined above, is added during the compounding of the adhesive. When an additive combination is used, such as a combination of a low molecular weight styrene-maleic anhydride copolymer ester and a low molecular weight maleated polybutadiene, the components of the additive can be added in varying amounts. In some embodiments, from 0 to about 15 weight percent of each component of the additive is used, such that at least one component is present in the additive. For an embodiment employing a low molecular weight styrene-maleic anhydride copolymer ester and a low molecular weight maleated polybutadiene as components of the additive, preferably from about 1 to about 12 weight percent of each component is used. More preferably, the total weight content of the additive composition (i.e., total weight content of all component polymers of the additive composition) in the said hot melt adhesive composition is generally of at least 3%.

An exemplary conventional hot melt adhesive, to which the additive of the present invention may be added, includes a styrene-isoprene-styrene (SIS) block copolymer, a hydrocarbon (C5 or C9) resin, rosin ester tackifiers, and/or a process oil. A SIS block copolymer may be employed in the hot melt adhesive, such as that which is sold by Kraton Performance Polymers Inc. of Houston, Tex. under the trade name Kraton D-1163. A C5 hydrocarbon tackifying resin may be utilized, such as that which is sold by Cray Valley U.S.A. of Exton, Pa. under the trade name Wingtack ET. A napthenic process oil, i.e. mineral oil, may be used in the hot melt adhesive as well, such as the one sold under the trade name Calsol 5550 by Calumet Specialty Products Partners, L.P. of Indianapolis, Ind. As is known to one skilled in the art, conventional hot melt adhesive may include a variety of other components including, but not limited to, starches, waxes, plasticizers, anti-oxidants, stabilizers, pigments, dyes, biocides, flame retardants, antistatic agents, or fillers. For example, the hot melt adhesive may include Irganox 1010, an antioxidant sold by Ciba/BASF.

The additive of the present invention may be introduced to a conventional hot melt adhesive by any process known to one skilled in the art. For example, when SMA ester and maleated polybutadiene are employed as the additive polymers, they may be introduced separately from each other and separate from, or in combination with, any of the individual components of the conventional hot melt adhesive. As a further example, the additive may be introduced to the components of a conventional hot melt adhesive comprising a styrene-isoprene-styrene (SIS) block copolymer, a hydrocarbon (C5 or C9) resin, and rosin ester tackifiers after the components are heated above their individual melting points. The SMA ester may be a commercially available low molecular weight product with high maleic anhydride contents, such as that sold by Cray Valley U.S.A. of Exton, Pa. under the trade name SMA. The maleated polybutadiene may similarly be a commercially available product, such as that sold by Cray Valley U.S.A. of Exton, Pa. under the trade name Ricon. A process oil, such as mineral oil, may be added last. The hot melt adhesive containing the additive is allowed to mix on the roll mill until it is homogeneous.

In another embodiment, the present invention is a hot melt adhesive label. The hot melt adhesive composition can be used in hot melt adhesive labels, preferably in hot melt pressure sensitive adhesive labels, particularly for recyclable glass articles which may be containers such as bottles. The labels can be removed with caustic, for example in a hot caustic bath, when the objects are recycled. Without being held to the theory, it is believed that the acid and/or anhydride groups of the additive impart caustic solubility to the otherwise insoluble other adhesive components such as styrene-isoprene-styrene (SIS) tri-block copolymer, hydrocarbon tackifying resin, and/or process oil. The present invention enables the manufacturing of a hot melt adhesive which has favorable water resistance and viscoelastic properties for adhesion to a substrate, for example the retention of a label on a glass bottle, while also imparting caustic removability to the hot melt adhesive formula. This allows for strong retention and adhesion characteristics when they are desired, but also removability of the hot melt adhesive from the substrate when it is necessary as in the recycling process.

The hot melt adhesive containing the additive may be applied to the label and/or the substrate by various processes known to one skilled in the art. In one representative process, the caustic removable hot melt adhesive of the present invention is melted and poured onto a blade coater. The blade coater can be employed to apply a thin film of the caustic removable hot melt adhesive to a release liner to which a face stock is laminated. The laminate may then be cut into label size strips for application to a substrate, such as a glass bottle.

In a further embodiment, the present invention is an article having a label adhered with a caustic removable hot melt adhesive composition containing an additive as defined above according to the invention. For hot melt adhesive labels, particularly for hot melt pressure sensitive adhesive labels, the adhesive is coated onto a release liner, which is then immediately laminated with a label facestock, which could be paper or plastic. The label is then applied to an article such as a glass bottle for identification and/or decorative purposes. After the contents of the article have been used, it may be desirable to recycle the article. To remove the label, articles can be placed in a hot caustic bath, which causes the adhesive to dissolve and/or delaminate from the article. The clean bottle or other article can then more easily be recycled without the contamination of the label and/or the adhesive. Until now, it has not been possible to remove conventional hot melt adhesive labels from articles in this way. Removal of the hot melt adhesive is made possible by adding the combination additive of the present invention.

The advantageous properties of this invention can be observed by reference to the following examples, which illustrate but do not limit the invention.

EXAMPLES

The following resins are used in combination as the additive according to the invention: (a) a low molecular weight product with high maleic anhydride contents sold by Cray Valley under the tradename "SMA", which has a styrene:maleic anhydride (S:MA) ratio of 1.5:1, a number average molecular weight (Mn) of 2,900 and a weight average molecular weight (Mw) of 7,000, which is esterified with a (45%/30%) cyclohexyl/isopropyl ester of a styrene-maleic anhydride (SMA) copolymer to an esterification ratio of 75%; and (b) a low molecular weight maleated polybutadiene sold by Cray Valley under the tradename "Ricon", which has a number average molecular weight (Mn) of 7,500, a weight average molecular weight (Mw) of 10,000, and is 20% w/w maleated. The molecular weight ranges are as measured by GPC (gel permeation chromatography) with polystyrene standards in THF (tetrahydrofuran).

The caustic removable hot melt adhesive with additive was prepared in the following general manner. During the process of making a conventional hot melt adhesive, styrene-isoprene-styrene (SIS) block copolymer, hydrocarbon (C5 or C9) resin, and rosin ester tackifiers are heated to above their individual melting points. The melted resins are then combined on a heated roll mill. Between 0-11 wt % of the SMA ester was added after the Kraton D-1163 SIS block copolymer, and 0-11 wt % of the maleated polybutadiene is added along with the Wingtack ET hydrocarbon tackifying resin. Calsol 5550 mineral oil is added last. The mixtures were allowed to mix on the roll mill until they were homogeneous, at which point they were removed from the mill into a carton. Table 1, below, shows the hot melt adhesive formulations which were tested. Sample 1 is used as the control for the tests, as that hot melt adhesive formulation contains neither the SMA ester or the maleated polybutadiene.

melt adhesive with additive mixed uniformly during compounding with a Sigma mixer. There was no phase separation at room temperature or in the 170° C. oven-heated samples (i.e., uniform cross-section).

Dynamic Mechanical Analysis was also performed on the samples, using a TA Instruments Rheometer AR 2000 on an 8 mm parallel plate. Dynamic Mechanical Analysis (DMA) is a thermoanalytical technique, which is well known to one having ordinary skill in the art, and is used to study the characteristics of materials, such as the viscoelastic nature of polymers. An oscillating force is applied to a sample of material and the resulting displacement of the sample is measured. The samples can be either solids, which are tested by linearly applied strains, or melts or liquids, which are normally tested in shear. The DMA sample deforms under the applied load. From this the stiffness of the sample can be determined, and the sample modulus can be calculated. It is possible to determine the damping properties of a material by measuring the time lag in the displacement compared to the applied force. The time lag is reported as a phase lag angle. The damping is called tan delta (δ), as it is reported as the tangent of the phase lag.

Viscoelastic materials such as polymers typically exhibit the properties of a glass (high modulus) at low temperatures, and those of a rubber (low modulus) at higher temperatures. This change of state, i.e., glass transition or alpha relaxation, can be observed by scanning the temperature during a DMA

TABLE 1

| | Sample Formulas Tested (in w/w %) | | | | | | |
|---|---|---|---|---|---|---|---|
| | Hydrocarbon | | | | | Additive | |
| Sample Formula | SIS Block Copolymer (Kraton D-1163) | tackifying resin (Wingtack ET) | Mineral Oil (Calsol 5550) | Antioxidant (Irganox 1010) | Total Weight % of Additive | Styrene-maleic Anhydride (SMA) | Maleated Polybutadiene (RICON) |
| 1 (Control) | 34.65 | 54.46 | 9.90 | 0.99 | 0.00 | 0.00 | 0.00 |
| 2 | 33.33 wt | 52.38 wt % | 9.52 wt % | 0.95 wt % | 3.80 wt % | 1.90 wt % | 1.90 wt % |
| 3 | 32.11 | 50.46 | 9.17 | 0.92 | 7.34 | 3.67 | 3.67 |
| 4 | 29.91 | 47.01 | 8.55 | 0.85 | 13.68 | 6.84 | 6.84 |
| 5 | 30.97 | 48.67 | 8.85 | 0.88 | 10.62 | 10.62 | 0.00 |
| 6 | 30.97 | 48.67 | 8.85 | 0.88 | 10.62 | 0.00 | 10.62 |

The sample formulas were initially tested for compatibility. It is noted that the combination additive of the present invention was found to be compatible with the components of conventional hot melt adhesives. The caustic removable hot experiment. The samples were observed for broadening of the tan δ peak, and/or the appearance of a second peak indicating a change of state, under the DMA. Table 2, below, presents the results of the Dynamic Mechanical Analysis.

TABLE 2

| | Dynamic Mechanical Analysis | | | | | | | |
|---|---|---|---|---|---|---|---|---|
| Sample Formula | Temp (° C.) | Tan (δ) | Temp $1^{st}$ X-over (° C.) | Storage Modulus G' (Pa) | Temp $2^{nd}$ X-over (° C.) | Storage Modulus G' (Pa) | Temp $3^{rd}$ X-over (° C.) | Storage Modulus G' (Pa) |
| 1 (Control) | 8 | 2.801 | −7.6 | $1.53*10^7$ | 23.1 | 60580 | 102.7 | 8824 |
| 2 | 8.1 | 2.755 | −7.9 | $1.78*10^7$ | 22.8 | 64160 | 102.1 | 8299 |
| 3 | 7.2 | 2.744 | −8.5 | $1.53*10^7$ | 22.6 | 64420 | 101.8 | 8454 |
| 4 | 8 | 2.729 | −7.6 | $1.58*10^7$ | 23.5 | 62480 | 101.5 | 8029 |
| 5 | 8.1 | 2.907 | −7.9 | $1.81*10^7$ | 23.6 | 65790 | 99.3 | 7811 |
| 6 | 8.1 | 2.733 | −8 | $1.54*10^7$ | 23.9 | 53240 | 101.9 | 7089 |

The cross-over temperatures identified by the Dynamic Mechanical Analysis correspond to the temperatures at which the G' storage modulus equaled the G" loss modulus. This is measured as a function of temperature from −50 to 125° C. by the DMA, at a temperature scan rate of 4° C. per minute and at a frequency of 1 Hz.

Table 2 shows that the samples formulas containing the additive yielded good initial compatibility results with the conventional hot melt composition of sample formula 1 (i.e., the control). As can be seen from Table 2, the sample formulas containing the additive exhibited similar DMA peaks (i.e. tan delta and cross-over temperature points) as the conventional hot melt composition of sample formula 1. Sample formulas 5 and 6, containing only one part of the combination additive, showed suitable but less favorable initial compatibility results. As such, when an SMA ester is selected as the low molecular weight maleic anhydride, a maleated polybutadiene is used in combination with the SMA ester to make the additive compatible with conventional hot melt adhesives. The overall results as shown in Table 2, also demonstrate that the essential viscoelastic performances of the adhesive composition are not significantly affected when the additive as defined according to the present invention is added to a conventional hot melt adhesive.

In addition to the Dynamic Mechanical Analysis test for initial compatibility, the compatibility of the additive with the conventional hot melt adhesive was tested and confirmed by additional independent methods. Visual observations were made of the formulations in a Sigma mixer. Under this method, the formulations were deemed compatible if there was an absence of visible phase separation. The adhesives were uniformly mixed during their compounding with the additive of the invention, and no visible phase separation was identified. Next, visual observations were made of oven heated samples, heated to 170° C. Again, an absence of visible phase separation was an indicator of compatibility. No phase separation was seen in the oven heated samples for the additive of the invention. Finally, visual observations were made of the applied film during coating. Under this method, a clear adhesive film was deemed compatible while a cloudy adhesive film was deemed incompatible. The results showed compatible clear adhesive films for the adhesive of the invention containing the additive.

The adhesive label of the present invention may be prepared by various methods known to one having ordinary skill in the art. In a separate step, the adhesive is melted and poured onto a blade coater so that a thin film of it can be applied to a release liner to which a face stock is laminated. The laminate is then cut into label size strips. To test the label, the release liner is removed and the label is applied to a substrate and rolled with a 4 lbs roller. Typical adhesive properties such as tack, peel and shear can be measured and compared with adhesives not containing the combination additive of the present invention. For adhesion tests, the adhesives were heated to 170° C. and coated onto a release liner and immediately laminated to a 1 mm thick polyethylene terephthalate film. The initial adhesive properties were measured after aging the coated adhesive sheets for 24 hours at 25° C. and 75% humidity. Aged adhesive properties were measured after aging the coated sheets for 1 week at 70° C. The aged adhesion results, when compared to the initial adhesion properties, showed that the adhesion properties were equivalent or improved.

The sample formulas were tested using standard test methods established by the Pressure Sensitive Tape Council (PSTC). The sample formulas were also tested for peel strength, according to PSTC Method 101 "International Standard for Peel Adhesion of Pressure Sensitive Tapes." Peel adhesion is the force required to remove a pressure sensitive tape from a test panel or its own backing at a controlled angle and at a standard rate and condition. The sample formulas were tested on high density polyethylene (HDPE), stainless steel (SS), and glass substrates for 180 degree peel adhesion. The sample formulas were further tested on HDPE, SS, and glass substrates for loop tack under PSTC Method 16. The results of these tests are shown in Table 3 below.

TABLE 3

| | | | Initial Adhesion Performance | | | | | |
|---|---|---|---|---|---|---|---|---|
| Sample Formula | SMA/ RICON | Total Additive % | Peel Adhesion on SS kN/m (lbf/in) | Peel Adhesion on Glass kN/m (lbf/in) | Peel Adhesion on HDPE kN/m (lbf/in) | Loop Tack Adhesion on SS kN/m (lbf/in) | Loop Tack Adhesion on Glass kN/m (lbf/in) | Loop Tack Adhesion on HDPE kN/m (lbf/in) |
| 1 (Control) | 0/0 | 0 | 1.38 (7.91) | 1.37 (7.84) | 0.658 (3.76) | 1.45 (8.27) | 1.48 (8.43) | 0.429 (2.45) |
| 2 | 1.90/1.90 | 3.80 | 0.905 (5.17) | 0.770 (4.4) | 0.564 (3.22) | 1.22 (6.94) | 1.21 (6.9) | 0.443 (2.53) |
| 3 | 3.67/3.67 | 7.34 | 0.932 (5.32) | 0.960 (5.48) | 0.597 (3.41) | 1.29 (7.37) | 1.19 (6.82) | 0.529 (3.02) |
| 4 | 6.84/6.84 | 13.68 | 0.937 (5.35) | 0.799 (4.56) | 0.437 (2.5) | 1.13 (6.46) | 1.11 (6.31) | 0.416 (2.38) |
| 5 | 10.62/0 | 10.62 | 0.870 (4.97) | 0.662 (3.78) | 0.340 (1.97) | 0.905 (5.17) | 0.893 (5.1) | 0.327 (1.87) |
| 6 | 0/10.62 | 10.62 | 0.668 (3.82) | 0.672 (3.84) | 0.510 (2.91) | 0.996 (5.69) | 1.07 (6.1) | 0.452 (2.58) |

As known by one having ordinary skilled in the art, the adhesive ingredients may be adjusted to achieve specifically desired adhesion properties. The amount of the low molecular weight α,β-unsaturated acid anhydride polymer can be varied to balance adhesion characteristics and initial compatibility with conventional hot melt formulations, while increasing water-resistance and caustic removability. For example, when a combination of SMA ester and maleated polybutadiene is used as the additive, a limited and acceptable decrease in overall adhesive properties was identified by the peel and loop tack tests. However, the combination additive was very compatible with conventional hot melt adhesive formulas containing SIS block copolymers, hydrocarbon resins, tackifier resins, and mineral oil with overall unaffected viscoelastic performance metrics, as shown in Table 1 above. This can effectively be seen by the results from the Dynamic Mechanical Analyses in Table 1, which show no significant change between the formulas containing the additive and the control formula (sample formula 1) containing no additive.

The combination additive of the present invention was found to be compatible with the conventional hot melt adhesives while also enabling them to be caustic removable. This additional characteristic is useful for many purposes, particularly in the recycling process. To determine this inventive feature, the samples were tested for caustic removability. The adhesives were heated to 170° C. and coated onto 12 inch by 1 inch (30.48 cm by 2.54 cm) adhesive strips of unbleached Kraft 30 lbs/ream paper to test caustic removability and cold water resistance. The labels were adhered to flat glass panels and rolled with a 4 lbs roller. The glass panels were immersed in a hot caustic bath consisting of 2.5% sodium hydroxide in water, heated to 80° C. Slight agitation was applied to the caustic bath.

The samples were timed for how long it took for the labels to remove from the panels and the adhesion was rated for the amount of adhesive residue left on the panels. Glass panels are kept immersed in the aqueous solution of NaOH at 2.5% at 80° C. for 5 minutes. Then, the strip adhesion (i.e., caustic removability) is measured and given a rating from 0 to 5, where 5 represents easy removal from the panel and no adhesive left on the panel and 0 represents no removal of the test strip (i.e., the adhesive remains on the substrate). The results below show that only the sample of composition 4 (with 6.84 w % of each component of the additive and 13.68 w % of global additive) is easily removable with a rate of 5 on glass.

TABLE 4

Caustic Removability Tests

| Sample Formula | SMA/Ricon Maleated Polybutadiene | Total Additive (w %) | Rate of Removability |
|---|---|---|---|
| 1 (Control) | 0/0 | 0 | 0 |
| 2 | 1.90/1.90 | 3.80 | 3 |
| 3 | 3.67/3.67 | 7.34 | 2 |
| 4 | 6.84/6.84 | 13.68 | 5 |
| 5 | 10.62/0 | 10.62 | 2 |
| 6 | 0/10.62 | 10.62 | 3 |

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:
1. A composition comprising:
a first polymer, selected from the group consisting of a carboxylic anhydride homopolymer and a carboxylic anhydride copolymer, containing a partial ester of a carboxylic anhydride or acid, said first polymer having a molecular weight less than 50,000; and a second polymer comprising an α, β ethylenically unsaturated polymer containing a carboxylic anhydride or acid selected from the group consisting of a polyolefin, a vinyl aromatic copolymer, and a graft copolymer, said second polymer having a molecular weight less than 50,000, wherein the weight percent of said first polymer in the composition is less than or equal to 15% and the weight percent of said second polymer in the composition is less than or equal to 15%.

2. A composition according to claim 1, wherein said carboxylic anhydride or acid of said first polymer is selected from the group consisting of maleic anhydride, fumaric acid, itaconic anhydride, itaconic acid, tetrahydrophthalic anhydride, and tetrahydrophthalic acid.

3. A composition according to claim 1, wherein said carboxylic anhydride or acid of said second polymer is selected from the group consisting of maleic anhydride, fumaric acid, itaconic anhydride, itaconic acid, tetrahydrophthalic anhydride, and tetrahydrophthalic acid.

4. A composition according to claim 1, wherein said first polymer is a maleic anhydride copolymer.

5. A composition according to claim 1, wherein said first polymer is a copolymer of the carboxylic anhydride or acid and a co-monomer, said co-monomer being selected from the group consisting of vinyl aromatic monomers, ethylene, and propylene, and wherein said first polymer has a molar ratio of said co-monomer to said carboxylic anhydride or acid of 1:1 to 2:1.

6. A composition according to claim 1, wherein said second polymer has a weight content of said carboxylic anhydride or acid of 10 to 50%.

7. A composition according to claim 1, wherein said first polymer is a styrene-maleic anhydride (SMA) copolymer and said second polymer is a maleated polybutadiene graft copolymer.

8. A composition according to claim 7, wherein the styrene-maleic anhydride copolymer has a structure according to Formula I:

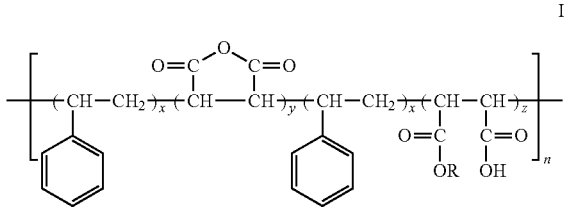

in which R is a residue of a monoalcohol selected from C1 to C12 monoalcohols; n ranges from 7 to 72; and x, y, and z are such that a molar ratio of (x:(y+z)) is in the range from 1:1 to 2:1, and (z/(y+z)) ranges from 50 to 100%.

9. A composition according to claim 7, wherein the maleated polybutadiene graft copolymer has a structure according to Formula II:

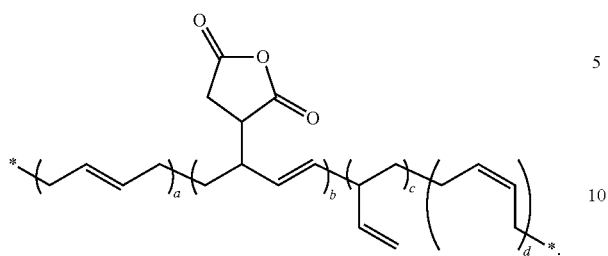

II

10. A composition according to claim 7, wherein the SMA copolymer has a ratio of styrene(S) : maleic anhydride(MA) of about 1:1 to about 2:1.

11. A composition according to claim 7, wherein the SMA copolymer has a ratio of styrene(S) : maleic anhydride(MA) of about 1.4:1 to about 1.6:1.

12. A composition according to claim 7, wherein the SMA copolymer has a molecular weight of about 2,000 to about 15,000; and the maleated polybutadiene graft copolymer has a molecular weight of about 2,000 to 10,000.

13. A composition according to claim 7, wherein the styrene-maleic anhydride (SMA) copolymer and maleated polybutadiene graft copolymer are present at a ratio of between 60:40 and 40:60.

14. A composition according to claim 1 having a global weight content of said first and second polymer of at least 3%.

* * * * *